US008595401B2

(12) United States Patent
Sanzone et al.

(10) Patent No.: US 8,595,401 B2
(45) Date of Patent: Nov. 26, 2013

(54) INPUT OUTPUT BRIDGING

(71) Applicant: Cavium, Inc., San Jose, CA (US)

(72) Inventors: Robert A. Sanzone, Hudson, MA (US);
David H. Asher, Sutton, MA (US);
Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 13/905,750

(22) Filed: May 30, 2013

(65) Prior Publication Data

US 2013/0282942 A1    Oct. 24, 2013

Related U.S. Application Data

(63) Continuation of application No. 13/280,768, filed on Oct. 25, 2011, now Pat. No. 8,473,658.

(51) Int. Cl.
*G06F 13/00* (2006.01)

(52) U.S. Cl.
USPC .......................................... 710/112; 711/151

(58) Field of Classification Search
USPC .............................. 710/11–119; 711/147–151
See application file for complete search history.

(56) References Cited

U.S. PATENT DOCUMENTS

| 2006/0059310 | A1 | 3/2006 | Asher et al. |
| 2006/0059316 | A1 | 3/2006 | Asher et al. |
| 2011/0225337 | A1 | 9/2011 | Byrne et al. |

FOREIGN PATENT DOCUMENTS

EP    1 313 023  A1    5/2003

OTHER PUBLICATIONS

"Single Chip 8 to 32-core OCTEON II™ MIPS64 Processors Provide up to 48 GHz of 64-bit Compute with Unmatched L3-L7 Data and Security Acceleration to Deliver 40 Gbps of throughput While Slashing Power Consumption for Next General Internet Infrastructure Applications," *Cavium Network Unveils OCTEON II CN68XX—Industry's Highest-Performance Multi-Core Processors for Energy-Efficient Data Center, Mobile Internet and the Borderless Enterprise* (May 2010).

International Search Report and Written Opinion of the International Searching Authority in International Application No. PCT/US2012/060601, "*Input Output Bridging*," dated Feb. 5, 2013.

*Primary Examiner* — Clifford Knoll
(74) *Attorney, Agent, or Firm* — Hamilton, Brook, Smith & Reynolds, P.C.

(57)    ABSTRACT

In one embodiment, a system includes a memory and a first bridge unit for processor access with the memory coupled with an input-output bus and the memory. The first bridge unit is configured to receive requests from the input-output bus to read or write data receive requests from the MFNU to free memory and choose among the requests to send to the memory on a first memory bus. The system also includes a second bridge unit for packet data access with the memory coupled with a packet input unit, packet output unit, and the memory. The second bridge unit is configured to receive requests to write packet data from the packet input unit, receive requests to read packet data from the packet output unit, and choose among the requests from the packet input unit and the packet output unit to send to the memory on a second memory bus.

22 Claims, 8 Drawing Sheets

INPUT OUTPUT BRIDGING

RELATED APPLICATIONS

This application is a continuation of U.S. application Ser. No. 13/280,768, filed Oct. 25, 2011. The entire teachings of the above application are incorporated herein by reference.

BACKGROUND

Processors that provide an interface for memory or processor access for multiple requestors may have their performance restricted by a large number of requestors, bandwidth requirements of the requestors, latency requirements of the requestors, and physical limitations on the chip. Limited bandwidth among the requestors can hinder the performance of the processor. For instance, a point of the chip that receives more requests than it can process does not have enough bandwidth and is considered a bottleneck.

SUMMARY

In one embodiment, a system comprises a memory, and a first bridge unit for processor access with the memory coupled with an input-output bus and the memory. The first bridge unit includes a first arbitration unit. The first arbitration unit is coupled with the input-output bus, a memory free notification unit ("MFNU"), and the memory. The first arbitration unit is configured to receive requests from the input-output bus to read or write data and receive requests from the MFNU to free memory. The first arbitration unit is further configured to choose among the requests from the input-output bus and from the MFNU to send to the memory on a first memory bus.

The system also includes a second bridge unit for packet data access with the memory. The second bridge unit is coupled with a packet input unit, packet output unit, and the memory. The second bridge unit includes a second arbitration unit. The second arbitration unit is coupled with the packet input unit, the packet output unit, and the memory. The second arbitration unit is configured to receive requests to write packet data from the packet input unit and receive requests to read packet data from the packet output unit. The second arbitration unit is further configured to choose among the requests from the packet input unit and the packet output unit to send to the memory on a second memory bus.

In another embodiment, the first bridge unit further reads from the memory on the first memory bus and transmits the reads from the memory to the input-output bus, and transmits confirmations of writes to the input-output bus. The second bridge unit further reads from the memory on the second memory bus and transmits the reads from the memory to the packet output unit, and transmits confirmations of the reads to the packet input unit.

In another embodiment, the first bridge unit receives requests from a plurality of cores, receives free memory completions, and reflects requests from the input-output bus. The first bridge unit includes an output arbitration unit. The output arbitration unit is configured to choose among the reads from the memory, the confirmation of writes, the requests from the plurality of cores, the free memory completions, and the reflected requests from the input-output bus to send to the input-output bus.

In one embodiment, the first bridge unit includes a fetch and add unit and an input from a schedule/synchronize/order bus ("SSO Bus"). The fetch and add unit is coupled with the SSO Bus and is configured to synchronize cores with core requests. The packet output unit is coupled with the input-output bus. The packet output unit is configured to communicate with the fetch and add unit through the input-output bus.

In one embodiment, the first bridge unit receives responses for multiple cores from multiple co-processors on the input-output bus, and generates responses for the cores in the fetch and add unit. The first bridge unit further comprises a third arbitration unit. The third arbitration unit is configured to choose among the responses from the co-processors on the input-output bus and the generated responses in the fetch and add unit to send to the cores.

In one embodiment, the input-output bus inputs to the first bridge unit as multiple inputs coupled with an input arbitration unit. The input arbitration unit is configured to choose between the multiple inputs to send to the first arbitration unit.

The first bridge unit may be coupled directly to a plurality of cores and configured to communicate directly with the cores. The input-output bus may be coupled with at least a packet output unit, a packet input unit, a free pools source, timers, a packet order/work source, a secure key memory, a compression core, a decompression core, a hyper finite automata core, a random number generator, a RAID controller, at least one USB controller, at least one PCIe controller, and a miscellaneous input-output unit. The packet input unit and packet output unit are both coupled with a network protocol layer.

In one embodiment, the first arbitration unit is coupled with a MFNU queue and an input-output bus queue. The MFNU queue stores requests from the MFNU to free memory. The input-output bus queue stores requests from the input-output bus to read data. The second arbitration unit is coupled with a packet input queue and a packet output queue. The packet output queue stores packets from the packet output unit and the packet input queue stores packets from the packet input unit.

In one embodiment, a method comprises, at a first bridge unit for processor access with a memory, requesting, from an input-output bus, to read or write data and requesting, from a memory free notification unit ("MFNU"), to free memory. The method further comprises choosing, in a first arbitration unit, among the request to read data and the request to free memory to transmit to the memory on a first memory bus.

In one embodiment, the method further comprises, at the first bridge unit, reading from the memory along the first memory bus, transmitting the reads along the first memory bus to the input-output bus, and transmitting confirmations of writes along the first memory bus to the input-output bus.

The method further comprises, at a second bridge unit for packet data access with the memory, requesting to read packet data from a packet output unit and requesting to write packet data from a packet input unit to the memory. The method further comprises choosing, in a second arbitration unit, among the request to read packet data and the request to write packet data to transmit to the memory on a second memory bus.

In another embodiment, the method comprises, at the second bridge unit, reading from the memory along the second memory bus, transmitting the reads along the second memory bus to the packet output unit, and transmitting confirmations of writes along the second memory busy to the packet input unit.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Before describing example embodiments of the present invention in detail, an example network security processor in which the embodiments may be implemented is described immediately below to help the reader understand the inventive features of the present invention.

Figure 1:
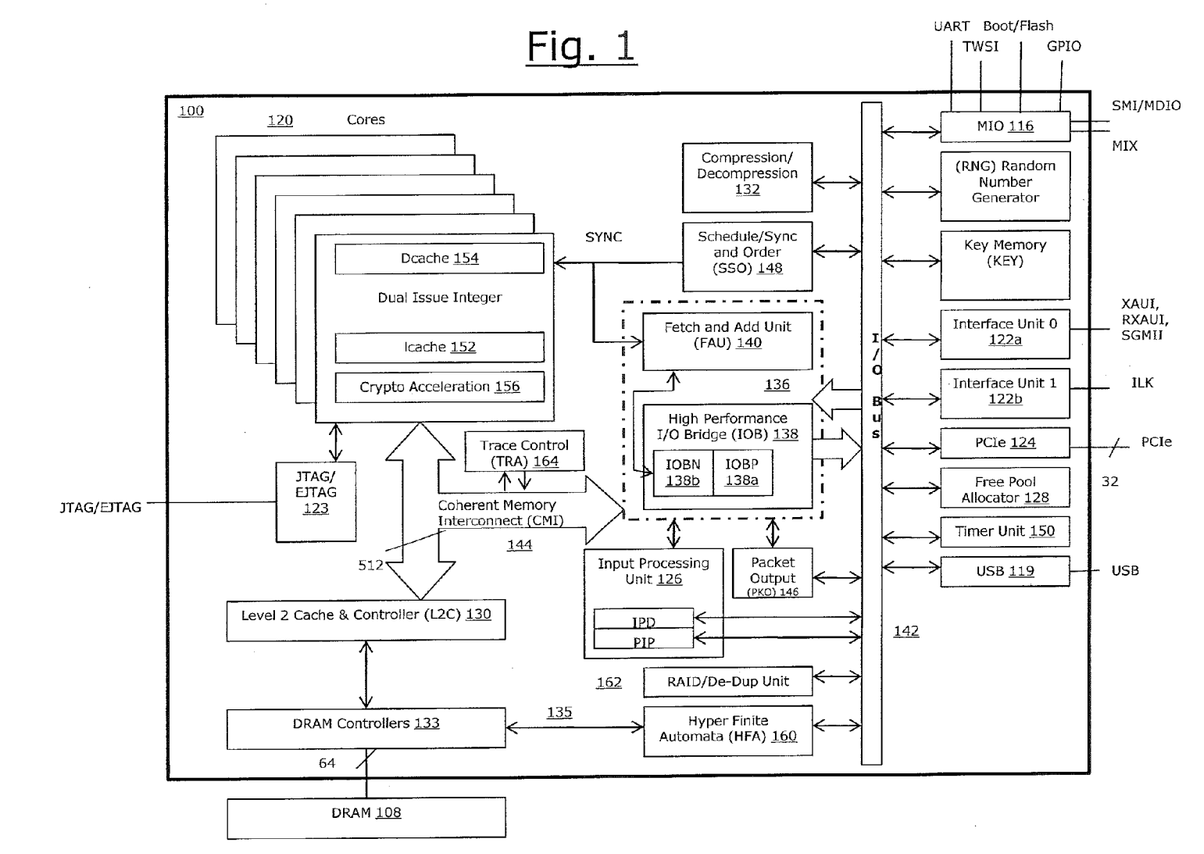
FIG. 1 is a block diagram illustrating a network services processor.

FIG. 1 is a block diagram illustrating a network services processor 100. The network services processor 100 delivers high application performance using at least one processor core 120.

The network services processor 100 processes Open System Interconnection network L2-L7 layer protocols encapsulated in received packets. As is well-known to those skilled in the art, the Open System Interconnection (OSI) reference model defines seven network protocol layers (L1-7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets.

The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by a plurality of interface units 122. A packet can also be received by a PCI interface 124. The interface unit 122 performs pre-processing of the received packet by checking various fields in the L2 network protocol header included in the received packet and then forwards the packet to a packet input unit 126. At least one interface unit 122a can receive packets from a plurality of X Attachment Unit Interfaces (XAUI), Reduced X Attachment Unit Interfaces (RXAUI), or Serial Gigabit Media Independent Interfaces (SGMII). At least one interface unit 122b can receive connections from an Interlaken Interface (ILK).

The packet input unit 126 performs further pre-processing of network protocol headers (e.g., L3 and L4 headers) included in the received packet. The pre-processing includes checksum checks for TCP/User Datagram Protocol (UDP) (L3 network protocols).

A free-pool allocator 128 maintains pools of pointers to free memory in Level-2 cache memory 130 and external DRAM 108. The packet input unit 126 uses one of the pools of pointers to store received packet data in Level-2 cache memory 130 or external DRAM 108 and another of the pools of pointers to allocate work queue entries for the processor cores 120.

The packet input unit 126 then writes packet data into buffers in Level-2 cache 130 or external DRAM 108. Preferably, the packet data is written into the buffers in a format convenient to higher-layer software executed in at least one of the processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing. For example, a compression/decompression co-processor 132 is provided that is dedicated to performing compression and decompression of received packets. Other embodiments of co-processing units include the RAID/De-Dup Unit 162, which accelerates data striping and data duplication processing for disk-storage applications.

Another co-processor is a Hyper Finite Automata (HFA) unit 160 which includes dedicated HFA thread engines adapted to accelerate pattern and/or signature matching necessary for anti-virus, intrusion-detection systems and other content-processing applications. Using a HFA unit 160, pattern and/or signature matching is accelerated, for example being performed at rates upwards of multiples of tens of gigabits per second. The HFA unit 160, in some embodiments, could include any of a Deterministic Finite Automata (DFA), Non-deterministic Finite Automata (NFA), or HFA algorithm unit.

An I/O interface 136 manages the overall protocol and arbitration and provides coherent I/O partitioning. The I/O interface 136 includes an I/O bridge 138 and a fetch-and-add unit 140. The I/O Bridge includes two bridges, an I/O Packet Bridge (IOBP) 138B and an I/O Bus Bridge (IOBN) 138A. The I/O Packet Bridge 138B is configured to manage the overall protocol and arbitration and provide coherent I/O portioning with primarily packet input and output. The I/O Bus Bridge 138A is configured to manage the overall protocol and arbitration and provide coherent I/O portioning with primarily the I/O Bus. Registers in the fetch-and-add unit 140 are used to maintain lengths of the output queues that are used for forwarding processed packets through a packet output unit 146. The I/O bridge 138 includes buffer queues for storing information to be transferred between a coherent memory interconnect (CMI) 144, an I/O bus 142, the packet input unit 126, and the packet output unit 146.

The miscellaneous I/O interface (MIO) 116 can include auxiliary interfaces such as General Purpose I/O (GPIO), Flash, IEEE 802 two-wire Management Interface (MDIO), Serial Management Interrupt (SMI), Universal Asynchronous Receiver-Transmitters (UARTs), Reduced Gigabit Media Independent Interface (RGMII), Media Independent Interface (MII), two wire serial interface (TWSI) and other serial interfaces.

The network services provider 100 may also include a Joint Test Action Group ("JTAG") Interface 123 supporting the MIPS EJTAG standard. According to the JTAG and MIPS EJTAG standards, a plurality of cores within the network services provider 100 each has an internal Test Access Port ("TAP") controller. This allows multi-core debug support of the network services provider 100.

A Schedule/Sync/Order Bus ("SSO Bus") module 148 queues and schedules work for the processor cores 120. Work is queued by adding a work queue entry to a queue. For example, a work queue entry is added by the packet input unit 126 for each packet arrival. A timer unit 150 is used to schedule work for the processor cores 120.

Processor cores 120 request work from the SSO Bus 148. The SSO Bus 148 selects (i.e., schedules) work for one of the processor cores 120 and returns a pointer to the work queue entry describing the work to the processor core 120.

The processor core 120, in turn, includes instruction cache 152, Level-1 data cache 154, and crypto-acceleration 156. In one embodiment, the network services processor 100 includes 32 superscalar Reduced Instruction Set Computer (RISC)-type processor cores 120. In some embodiments, each of the superscalar RISC-type processor cores 120 includes an extension of the MIPS64 version 3 processor core. In one embodiment, each of the superscalar RISC-type processor cores 120 includes a cnMIPS II processor core.

Level-2 cache memory 130 and external DRAM 108 are shared by all of the processor cores 120 and I/O co-processor devices. Each processor core 120 is coupled to the Level-2 cache memory 130 by the CMI 144. The CMI 144 is a communication channel for all memory and I/O transactions between the processor cores 100, the I/O interface 136 and the Level-2 cache memory 130 and controller. In one embodiment, the CMI 144 is scalable to 32 processor cores 120, supporting fully-coherent Level-1 data caches 154 with write through. Preferably the CMI 144 is highly-buffered with the ability to prioritize I/O. The CMI is coupled to a trace control unit 164 configured capture bus request so software can later read the request and generate a trace of the sequence of events on the CMI.

The Level-2 cache memory controller 131 maintains memory reference coherence. It returns the latest copy of a block for every fill request, whether the block is stored in Level-2 cache memory 130, in external DRAM 108, or is "in-flight." It also stores a duplicate copy of the tags for the data cache 154 in each processor core 120. It compares the addresses of cache-block-store requests against the data-cache tags, and invalidates (both copies) a data-cache tag for a processor core 120 whenever a store instruction is from another processor core or from an I/O component via the I/O interface 136.

In some embodiments, a plurality of DRAM controllers 133 supports up to 128 gigabytes of DRAM. In one embodiment, the plurality of DRAM controllers includes four DRAM controllers, each of the DRAM controllers supporting 32 gigabytes of DRAM. Preferably, each DRAM controller 133 supports a 64-bit interface to DRAM 108. Additionally, the DRAM controller 133 can supports preferred protocols, such as the DDR-III protocol.

After a packet has been processed by the processor cores 120, the packet output unit 146 reads the packet data from the Level-2 cache memory 130, 108, performs L4 network protocol post-processing (e.g., generates a TCP/UDP checksum), forwards the packet through the interface units 122 or the PCI interface 124 and frees the L2 cache memory 130/DRAM 108 used by the packet.

The DRAM Controllers 133 manages in-flight transactions (loads/stores) to/from the DRAM 108. In some embodiments, the DRAM Controllers 133 include four DRAM controllers, the DRAM 108 includes four DRAM memories, and each DRAM controller is connected to a DRAM memory. The DFA unit 160 is coupled directly to the DRAM Controllers 133 on a bypass-cache access path 135. The bypass-cache access path 135 allows the HFA Unit to read directly from the memory without using the Level-2 cache memory 130, which can improve efficiency for HFA operations.

Figure 2:
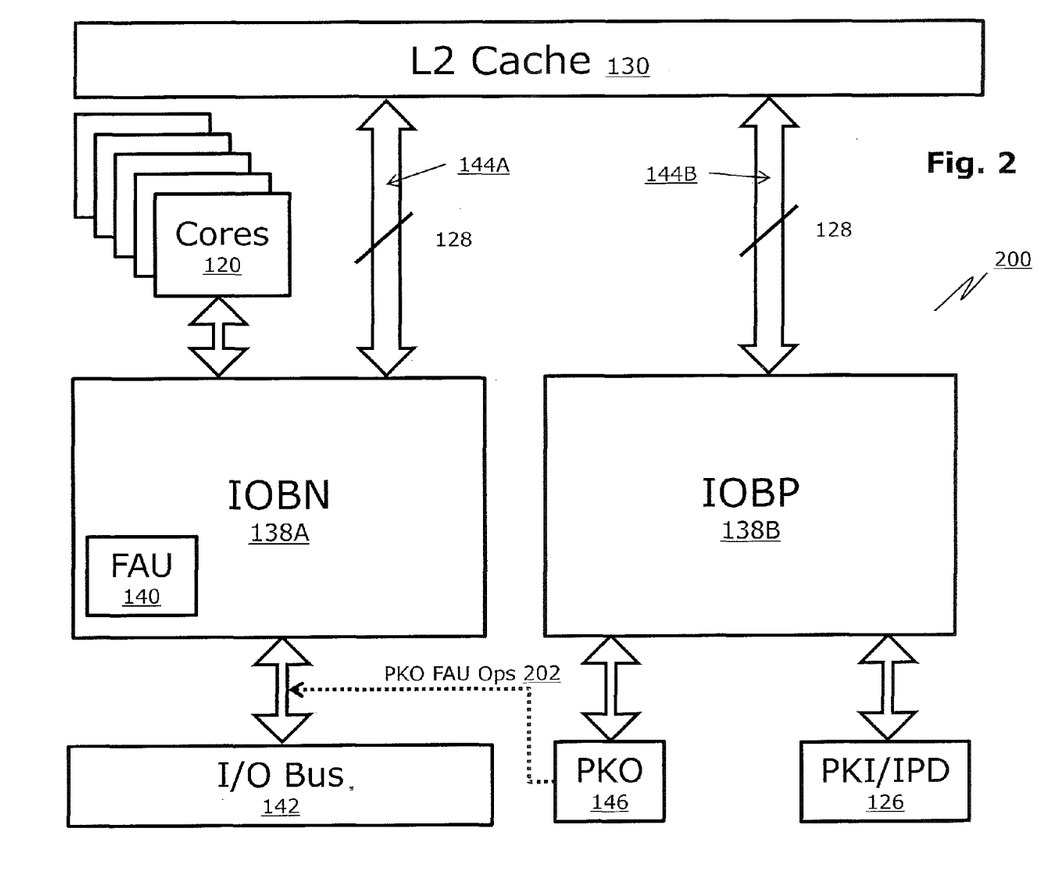
FIG. 2 is a block diagram illustrating an implementation of an I/O bridge including an I/O Packet Bridge (IOBP) and an I/O Bus Bridge (IOBN).

FIG. 2 is a block diagram illustrating an implementation 200 of an I/O bridge (IOB) 138 including an I/O Bus Bridge (IOBN) 138A and an I/O Packet Bridge (IOBP) 138B. The IOB 138 is coupled with the Level-2 cache memory 130 through the CMI 144. The IOBN 138A is coupled to the Level-2 cache memory 130 through a first CMI 144A and the IOBP 138B is coupled to the Level-2 cache memory 130 through a second CMI 144B. In one embodiment, the first and second CMI 144A and 144B have a bit-width of 128 bits. In one embodiment, the IOB 138, as a whole unit including the IOBN 138A and the IOBP 138B, has twice the bandwidth to the Level-2 cache memory 130 than if it only had one CMI line 144.

The IOBN 138A receives memory and processor requests from the I/O Bus 142. The I/O Bus 142 generates either a memory read or write request to the IOBN 138A. The IOBN 138A forwards the request memory read or write request to the Level-2 cache memory 130 along the first CMI 144A. The Level-2 cache memory 130 returns data from the memory read request or a confirmation from the memory write request along the first CMI 144A. The IOBN 138A then relays the data from the memory read request of the confirmation from the memory write request to the I/O Bus 142. The IOBN 138A also forwards processor requests from the I/O Bus 142 to the at least one processor core 120. Likewise, the IOBN 138A forwards requests from the plurality of cores to co-processors along the I/O Bus 142.

The IOBN 138A also includes a fetch-and-add unit 140. The fetch-and-add unit 140 flags unavailable hardware resources. The fetch-and-add unit 140 also notifies the plurality of cores 120 which resources are unavailable. The packet output unit 146 communicates with the IOBN through the I/O Bus 142 along fetch-and-add unit operations path 202 to provide operations to the fetch-and-add unit 140.

The IOBP 138B receives packet data to store in memory and receives requests to store packet data in memory. The IOBP 138B is coupled with the packet input unit (PKI/IPD) 126 and the packet output unit (PKO) 146. The packet input unit 126 receives packets from other interfaces of the processor 100 and sends the packets to the IOBP 138B to be stored in memory. The IOBP 138B forwards the requests to store the packets along the second CMI 144B to the Level-2 cache memory 130, where the packets are stored. In some instances, the packets are forwarded to an external memory, such as the DRAM 108 of FIG. 1. Returning to FIG. 2, the Level-2 cache memory 130 transmits a confirmation that it wrote the packets to memory along the second CMI 144B to the IOBP 138B. The IOBP 138B then relays the confirmation to the packet input unit 126.

The packet output unit 146 generates and sends requests to fetch packets to the IOBP 138B and then transmits the fetched packets on other interfaces of the processor 100. The IOBP 138B forwards the request to fetch the packets along the second CMI 144B. The Level-2 cache memory retrieves the requested data and returns it to the IOBP 138B along the second CMI 144B. The IOBP 138B then returns the requested data to the packet output unit 146.

Figure 3:
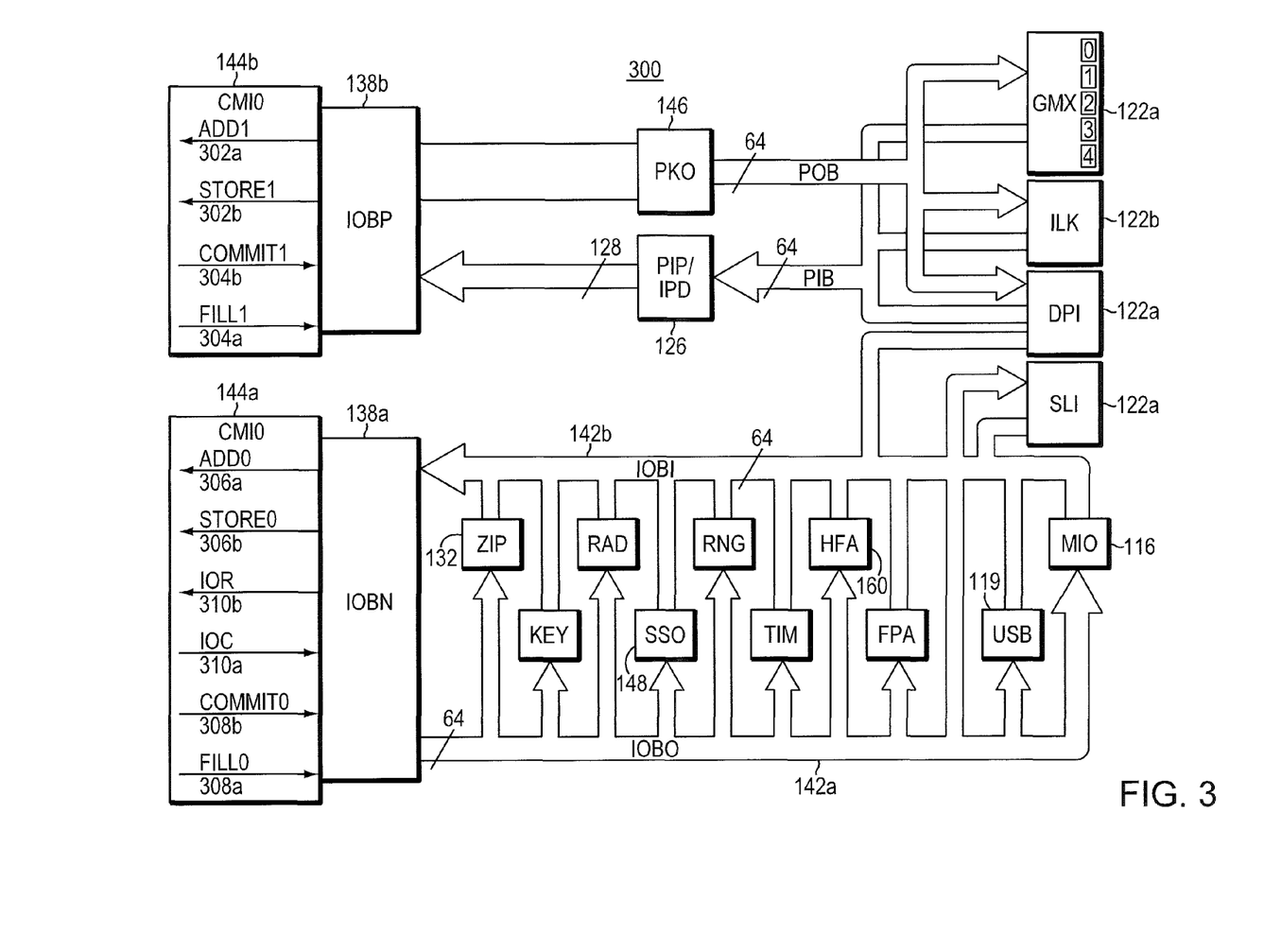
FIG. 3 is a block diagram illustrating the network service processor with an I/O bridge including an IOBP and an IOBN.

FIG. 3 is a block diagram illustrating the network service processor with an I/O bridge 138 including an IOBN 138A and an IOBP 138B. FIG. 3 is operatively similar to FIG. 2, but shows more details of the network service processor in some aspects. As in FIG. 2, the IOBP 138B in FIG. 3 is coupled with the packet output unit 146 and the packet input unit 126. Both the packet output unit 146 and the packet input unit 126 are coupled with interface unit one 122a and interface unit two 122b.

The IOBN 138A is coupled to the I/O Bus 142, which in FIG. 3 includes an I/O Bus Outbound 142A and an I/O Bus Inbound 142B. Both the I/O Bus Outbound 142A and I/O Bus Inbound 142B are coupled with the compression/decompression co-processor 132, the SSO Bus 148, the HFA Unit 160, a USB unit 119, a miscellaneous input/output unit 116, the interface unit one 122a, and other various components and coprocessors.

The IOBN 138A is also coupled with the first CMI 144A. The first CMI 144A includes a first inbound memory bus 306A and 306B and a first outbound memory bus 308A and 308B. The first inbound memory bus 306 includes an add line 306A and a store line 306B. The first outbound memory bus 308 includes a fill line 308A configured to fill memory reads and a commit line d08B that confirms a memory write is completed. The first CMI 144A also includes a processor response line (IOC) 310A and a processor request line (IOR) 310B. The processor response line (IOC) 310A sends responses of processor requests to the IOBN 138A, which can process the responses internally, or relay the responses to the I/O Bus Outbound 142A. The processor request line (IOR) 310B requests that one of the processors perform an operation.

The IOBP 138B is also coupled with the second CMI 144B. The second CMI 144B includes a second inbound memory bus 302A and 302B and a second outbound memory bus 304A and 304B. The second inbound memory bus 302 includes an add line 302A and a store line 302B. The second outbound memory bus 304 includes a fill line 304A configured to fill memory reads and a commit line 304B that confirms a memory write is completed.

Figure 4:
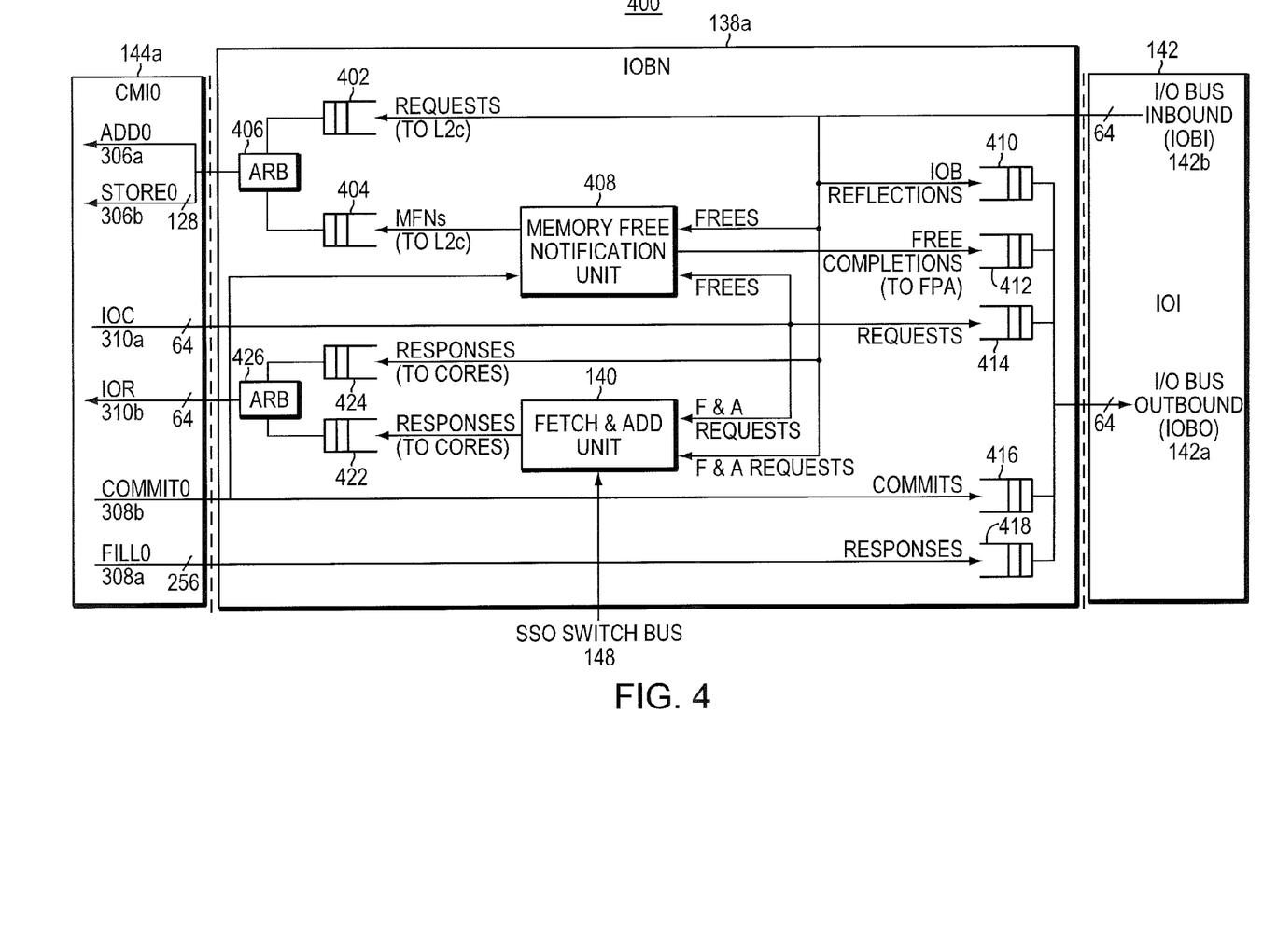
FIG. 4 is a block diagram illustrating an embodiment of the IOBN coupled with the first CMI and the I/O Bus.

FIG. 4 is a block diagram illustrating an embodiment 400 of the IOBN 138A coupled with the first CMI 144A and the I/O Bus 142. The first CMI 144A and I/O Bus 142 are operatively coupled to the IOBN 138A in the same manner described in FIGS. 2 and 3.

The IOBN 138A includes a memory free notification unit (MFNU) 408 and the fetch-and-add unit 140. The MFNU 408 is coupled with the I/O Bus Inbound 142B to receive memory free requests from the I/O Bus 142. The MFNU 408 is also coupled with the processor response line 310A to receive memory free requests from the plurality of processors 120. The MFNU 408 arbitrates among the multiple requests and chooses which memory free request to output.

The MFNU 408 is coupled to a memory free request queue 404. The MFNU outputs the memory free request it chooses each clock cycle to the memory free request queue 404. The MFNU 408 also outputs free completions that indicate that a request to free a memory address in the cache is complete. The I/O Bus Inbound 142B is also coupled with an I/O Bus request queue 402. Both the memory free request queue 404 and the I/O Bus request queue 402 are coupled with a first memory arbitration unit 406. The first memory arbitration unit 406 chooses among the memory free requests and the I/O Bus requests to send to the first inbound memory bus 306. The first memory arbitration unit 406 employs a method of hardware arbitration, such as round robin arbitration, fixed priority arbitration, or weighted round robin arbitration. A person of ordinary skill in the art could configure the first memory arbitration unit 406 to perform other methods of hardware arbitration.

The fetch and add unit 140 is coupled with the SSO Bus 148 to receive resource availability information, the processor response line 310A to receive fetch-and-add requests, and the I/O Bus Inbound 142B to receive fetch-and-add requests. The fetch-and-add unit 140 outputs responses to the cores.

The fetch-and-add unit 140 is coupled with a fetch-and-add response queue 422. The I/O Bus Inbound is coupled with an I/O Bus response queue 424. The fetch-and-add response queue 422 is coupled with a processor arbitration unit 426. The processor arbitration unit 426 chooses among the fetch-and-add responses and the I/O Bus responses to output to the processor request line (IOR) 310B. The processor arbitration unit 426 employs a method of hardware arbitration, such as round robin arbitration, fixed priority arbitration, or weighted round robin arbitration. A person of ordinary skill in the art could configure the processor arbitration unit 426 to perform other methods of hardware arbitration.

In one embodiment, the IOBN 138A includes an I/O Bus reflection queue 410 coupled with the I/O Bus Inbound 142B as an input and the I/O Bus Outbound 142A as an output. The I/O Bus reflection queue 410 stores reflections of requests from the I/O Bus Inbound 142B. Reflecting requests from the I/O Bus Inbound 142B back to the I/O Bus Outbound 142A lets the rest of the processor know which requests have been forwarded to the IOBN 138A.

The IOBN 138A includes a free completion queue 412 coupled with the memory free notification unit 408 as an input and the I/O Bus Outbound 142A as an output. The free completion queue 412 holds notifications that MFNU requests to be free have completed.

The IOBN 138A includes a co-processor requests queue 414 coupled with the processor response line (IOC) 310A as an input and the I/O Bus Outbound 142A as an output. The co-processor requests queue 414 holds requests for co-processors connected to the I/O Bus 142.

The IOBN 138A includes both a first memory commit queue 416 and a first memory response queue 418. The first memory commit queue 416 is coupled to the commit line 308B as an input and the I/O Bus Outbound 142A as an output. The first memory commit queue 416 holds confirmations that memory requests are completed. The first memory response queue 418 is coupled to the fill line 308A as an input and the I/O Bus Outbound 142A as an output. The first memory response queue 418 holds data responding to memory requests.

Figure 5:
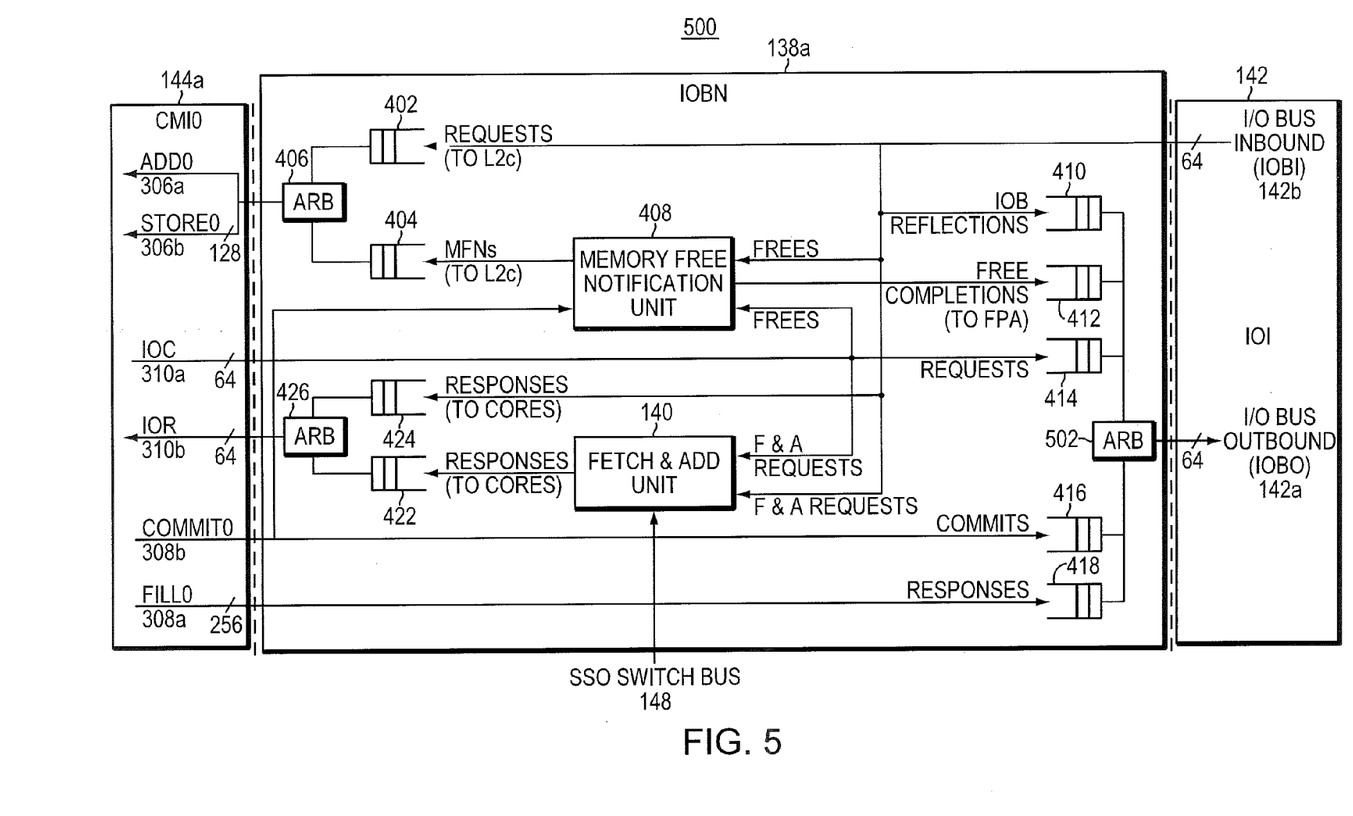
FIG. 5 is a block diagram illustrating another embodiment of the IOBN coupled with the first CMI and the I/O Bus.

FIG. 5 is a block diagram illustrating another embodiment 500 of the IOBN 138A coupled with the first CMI 144A and the I/O Bus 142. The embodiment 500 in FIG. 5 is operatively similar to the embodiment 400 in FIG. 4. However, in this embodiment 500, an outbound bus arbitration unit 500 is coupled with, as inputs, the I/O Bus reflection queue 410, the free completion queue 412, the co-processor request queue 414, the first memory commit queue 416, and the first memory response queue 418, and as an output, the I/O Bus 142A. In one embodiment, the outbound bus arbitration unit 500 employs a method of arbitration that combines fixed priority and round robin. This method always gives priority to the I/O Bus reflection queue 410. The I/O Bus reflections should immediately return to the I/O Bus Outbound 142A because the I/O Bus needs to know which requests the IOBN 138A has processed. When the I/O Bus reflection queue 410 is empty, the outbound bus arbitration unit 500 employs a round robin method of hardware arbitration among the free completion queue 412, the co-processor request queue 414, the first memory commit queue 416, and the first memory response queue 418. A person of ordinary skill in the art could configure the outbound arbitration unit 502 to perform other methods of hardware arbitration.

Figure 6:
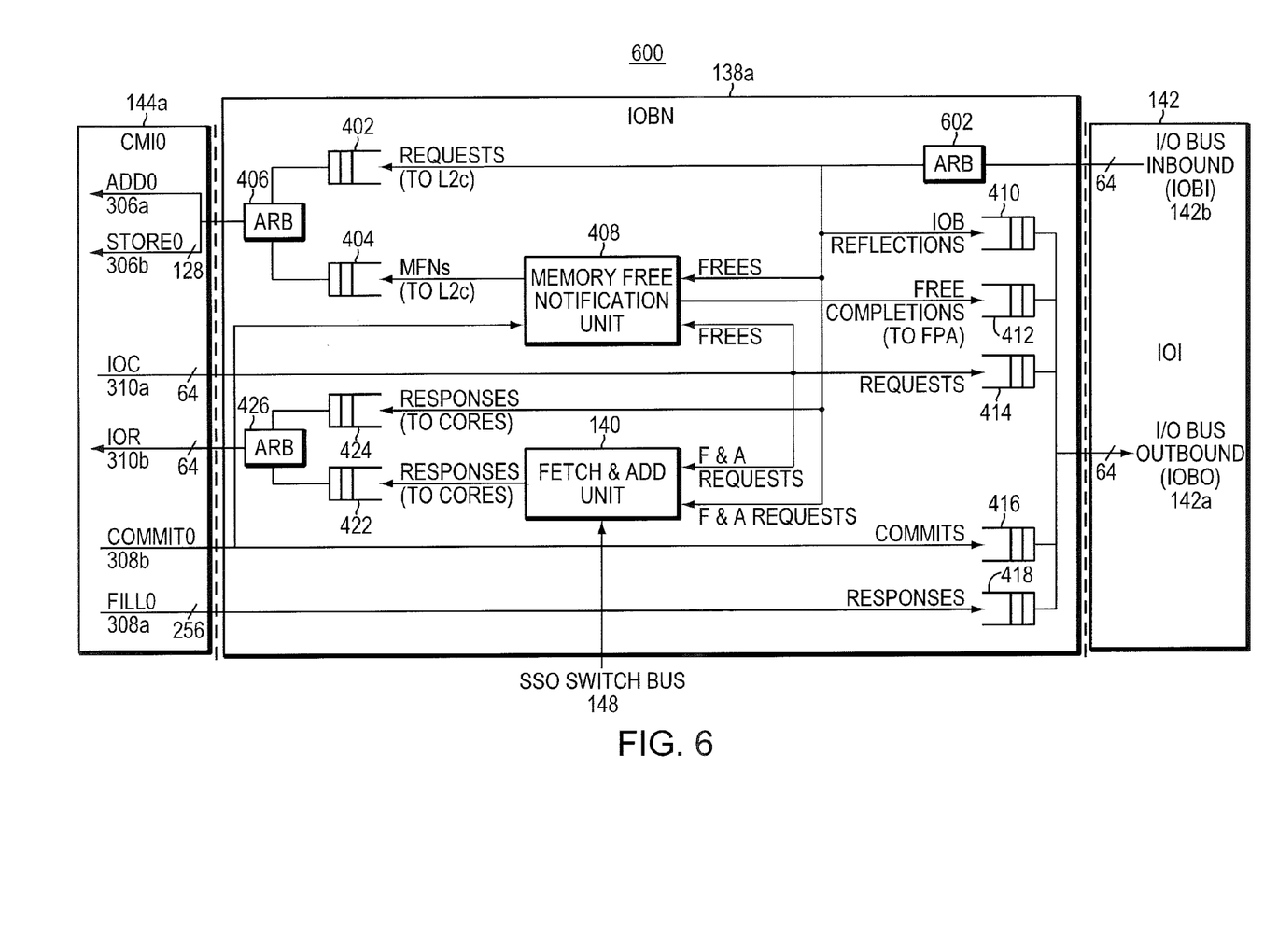
FIG. 6 is a block diagram illustrating another embodiment of the IOBN coupled with the first CMI and the I/O Bus.

FIG. 6 is a block diagram illustrating another embodiment 600 of the IOBN 138A coupled with the first CMI 144A and the I/O Bus 142. In this embodiment, the inbound bus arbitration unit 602 is coupled with the I/O Bus Inbound 142B and the I/O Bus request queue 402. The inbound bus arbitration unit 602 is configured to arbitrate among requests from various components coupled with the I/O Bus 142. The inbound bus arbitration unit 602 employs a method of hardware arbitration, such as round robin arbitration, fixed priority arbitration, or weighted round robin arbitration. A person of ordinary skill in the art could integrate other methods of hardware arbitration into the inbound bus arbitration unit 602.

A person of ordinary skill of the art can combine the features of FIG. 4, FIG. 5, and FIG. 6 in various combinations. For instance, one embodiment features both the outbound bus arbitration unit 502 and the inbound bus arbitration unit 602.

Figure 7:
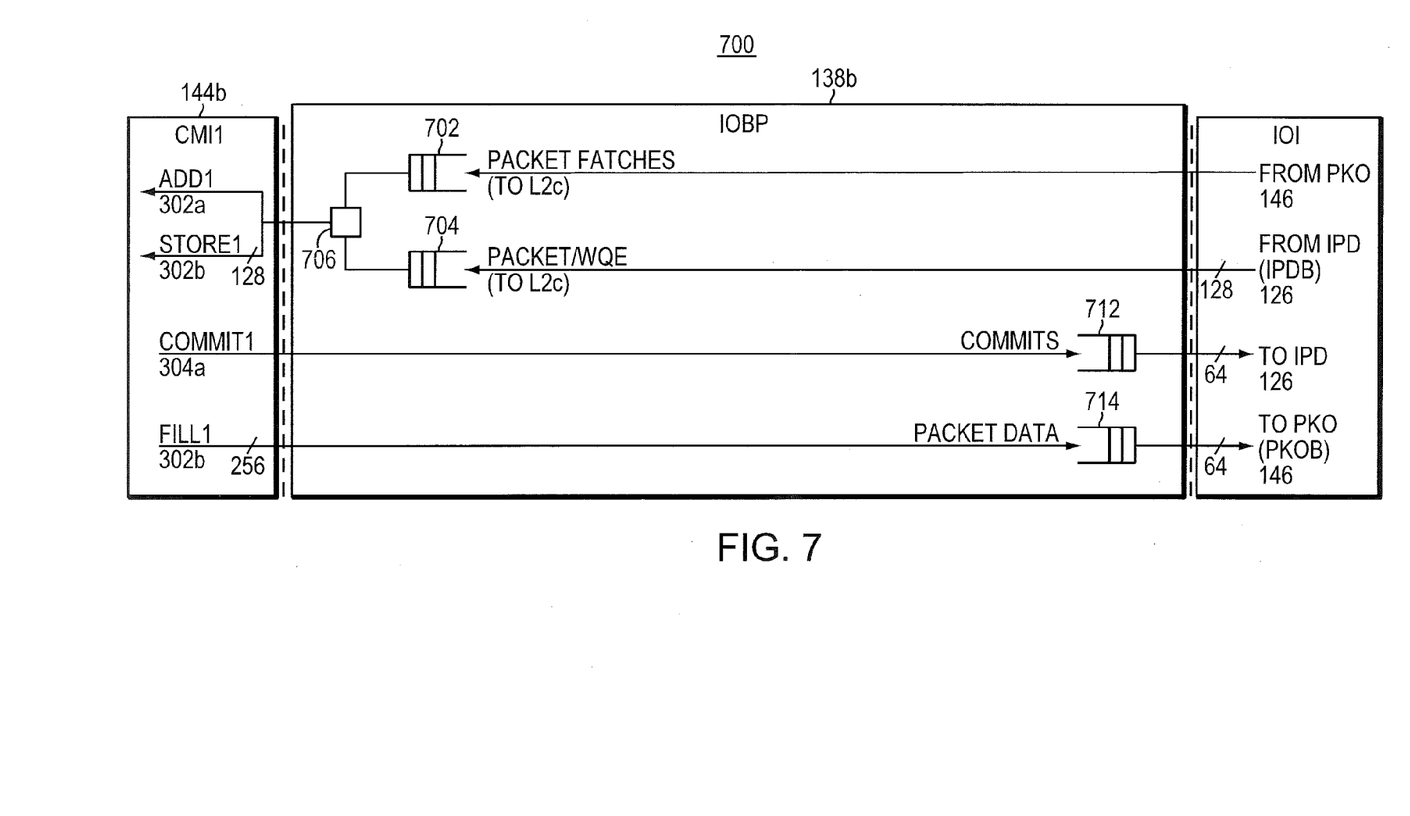
FIG. 7 is a block diagram illustrating an embodiment of the IOBP coupled with the second CMI and the packet input unit and packet output unit.

FIG. 7 is a block diagram illustrating an embodiment 700 of the IOBP 138B coupled with the second CMI 144B and the packet input unit 126 and packet output unit 146. The IOBP 138B includes a packet fetch queue 702 coupled with the PKO 146 as an input. The packet fetch queue 702 stores instructions to fetch data from memory to output them from the packet output unit 146. The IOBP 138B further includes a packet store queue 704 coupled to the packet input unit 126 as an input. The packet store queue 704 stores packet data received by the packet input unit 126 to be written to the memory. A packet arbitration unit 706 chooses whether to send the data in the packet fetch queue 702 or the data in the packet store queue 704 to the second memory bus 302.

The IOBP further includes a packet output queue 714 coupled to the second fill line 304B as an input and to the packet output unit 146 as an output. The packet output unit 146 stores data requested from the memory to output through the packet output unit 146. The IOBP also includes a packet commit queue 712 coupled to the second commit line 304A as an input and to the packet input unit 126 as an output. The packet commit queue 712 stores confirmations data received by the packet input unit 126 was written to memory.

Figure 8:
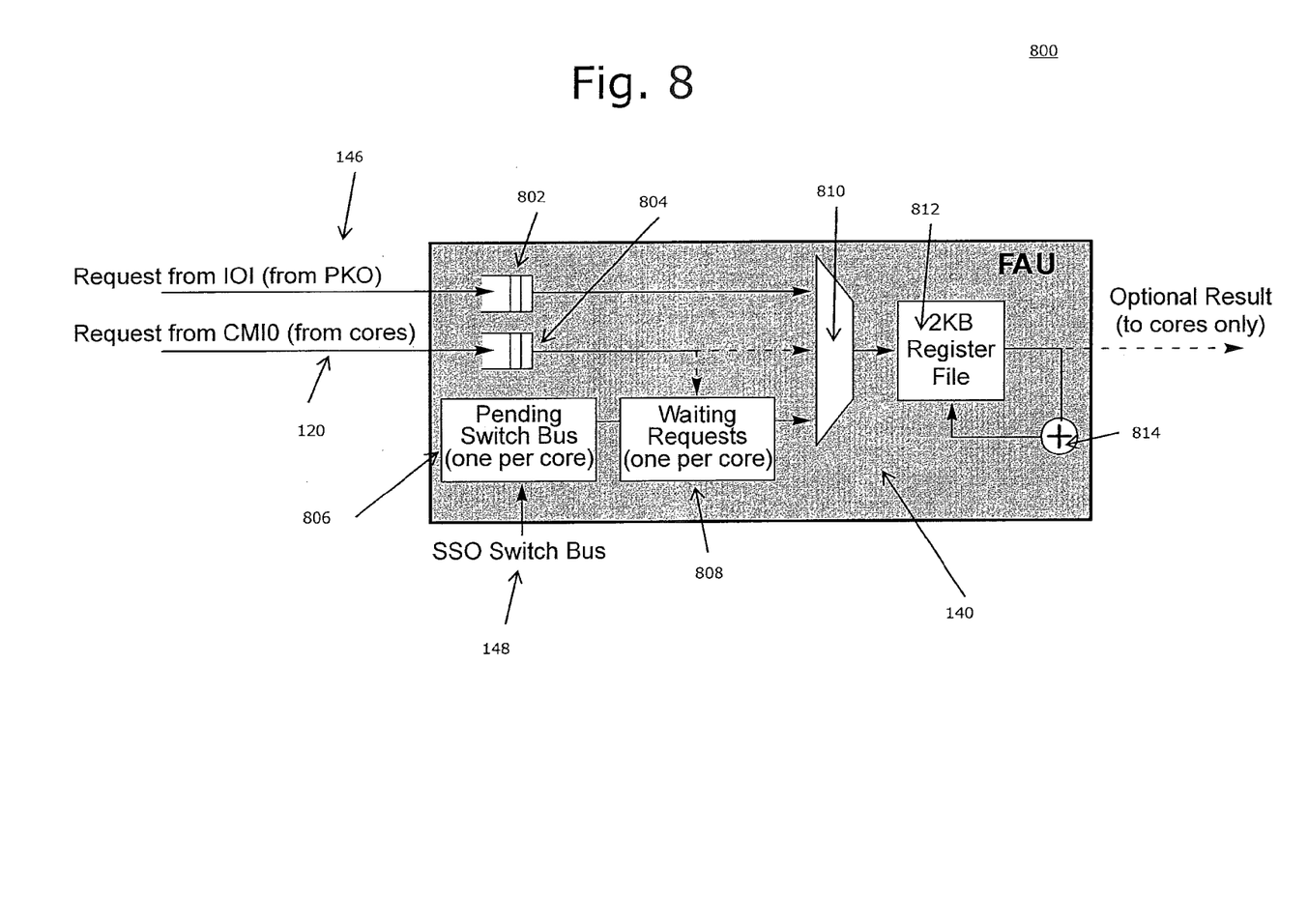
FIG. 8 is a block diagram illustrating an embodiment of the fetch and add unit.

FIG. 8 is a block diagram illustrating an embodiment of the fetch-and-add unit 140. The fetch-and-add unit 140 includes a 2 KB register file supporting read, write, atomic fetch-and-add, and atomic-update operations. Both the cores and the packet output unit 146 are coupled with the fetch-and-add unit 140. The cores use the fetch-and-add unit 140 for general synchronization purposes, including assigning unique positions for inserting items into shared queues.

The packet output unit 146 issues commands to the fetch-and add-unit 410 because the 2K Register file 812 stores lengths of up to 256 output queues to transfer packets off-chip via the packet output unit 146. Core software increments counters in the fetch-and-add unit 140 when the core adds a packet to a queue. The core software decrements the same counter after the packet output unit 146 removes the packet from a queue to transmit it off-chip. The 2K Register File 812 continually tracks the size of the output queue either in packets, bytes, or a combination of packets and bytes. The core software requests current queue size when it implements quality-of-service (QOS) algorithms such as Random Early Discard (RED).

The fetch-and-add unit 140 is tightly integrated with the tag switch synchronization provided by the SSO Bus 148. This tight integration minimizes critical section latencies when both tag switch and fetch-and-add unit synchronization is required. The fetch-and-add unit 140 tracks the pending tag switch state for each core with a pending switch bus 806. The fetch-and-add unit 140 considers a tag switch to be pending between the time when the SSO tag switch store issues until the time when a switch completion indication returns via the SSO Bus 148. This fetch-and-add unit pending switch logic conservatively estimates the pending switch state at both the cores and SSO Bus 148. The fetch-and-add unit 140 exactly tracks the switch state of switches that are not descheduled.

Each core specifies the "tag wait" feature for up to one outstanding fetch-and-add unit request at any time. Hardware does not restrict the number of outstanding fetch-and-add unit requests that do not specify the tag wait feature. When the "tag wait" feature is specified, the fetch-and-add unit 140 attempts to delay the fetch-and-add unit request until the prior tag switch is no longer pending. The waiting request unit 808 buffers the delayed requests in a store that contains one entry per core while hardware delays the request.

The fetch-and-add unit 140 processes a request immediately if the "tag wait" feature is not enabled. The fetch-and-add unit 140 also processes requests with the preferred tag wait requests immediately when it estimates there is not a pending switch. If the fetch-and-add unit 140 buffers a tag-wait request for an expended period of time, a "time out" scenario is triggered and the fetch-and-add unit removes the "tag wait" request from the buffer, returns a failure indication to requestor, and does not perform the operation specified in the request. The tag wait time-out length can be any multiple of 256 internal clock cycles.

The fetch-and-add unit receives requests from the packet output unit 146 in a fetch-and-add unit PKO queue 802, and requests from the cores in a fetch-and-add unit Core queue 804. An fetch-and-add unit arbitrator 816 arbitrates between requests from the cores 802, requests from the PKO 804, and the waiting request unit 808. The fetch-and-add unit 140 completes the requests by reading and writing to the 2 KB Register File 812. The fetch-and-add unit 140 reflects some core-generated fetch-and-add unit requests to the CMI.

The cores issue operations to the fetch-and-add unit 140 through Load, Store, and I/O Bridge Direct Memory Access (IOBDMA) instructions. For load and store operations, the fetch-and-add unit operation size matches the size specified by the instruction. For example, a core byte-load instruction initiates a byte operation on the register file. Therefore, the register value changes, and the load result is returned only for the particular byte in the register file referenced by the LB/LBU instruction. All the core load/store instruction sizes operate on the fetch-and-add register file, including 8-bit, 16-bit, 32-bit, and 64 bit operations.

IOBDMA operations destined for the fetch-and-add unit 140 return a 64-bit result to the core but the actual operation performed by the hardware and the effective result returned may be either 8-bits, 16-bits, 32-bits, or 64-bits. The configuration of the particular core that executes the load/store selects the endian-ness of the 8-bit, 16-bit, and 32-bit loads/stores. The fetch-and-add unit 140 includes a status bit that specifies either little-endian or big-endian addressing for IOBDMA operations. This IOBDMA endian configuration value is common to all cores.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a memory;
    a first bridge unit for processor access with the memory coupled with an input-output bus and the memory, the first bridge unit configured to receive requests from the input-output bus to read or write data receive requests from a memory free notification unit (MFNU) to free memory, and choose among the requests to send to the memory on a first memory bus; and
    a second bridge unit for packet data access with the memory coupled with a packet input unit, packet output unit, and the memory, the second bridge unit configured to receive requests to write packet data from the packet input unit, receive requests to read packet data from the packet output unit, and choose among the requests from the packet input unit and the packet output unit to send to the memory on a second memory bus.

2. The system of claim 1, wherein
    the first bridge unit further reads from the memory on the first memory bus and transmits the reads from the memory to the input-output bus, and transmits confirmations of writes to the input-output bus; and
    the second bridge unit further reads from the memory on the second memory bus and transmits the reads from the memory to the packet output unit, and transmits confirmations of writes to the packet input unit.

3. The system of claim 2, wherein the first bridge unit receives requests from a plurality of cores, receives free memory completions, and reflects requests from the input-output bus, and the first bridge unit is further configured to choose among the reads from the memory, the confirmation of the reads, the requests from the plurality of cores, the free memory completions, and the reflected requests from the input-output bus to send to the input-output bus.

4. The system of claim 1, wherein the first bridge unit further comprises a fetch and add unit and an input from a schedule/synchronize/order bus ("SSO Bus"), the fetch and add unit coupled with the SSO Bus and configured to synchronize one or more cores with one or more core requests.

5. The system of claim 4, wherein the packet output unit is coupled with the input-output bus, the packet output unit configured to communicate with the fetch and add unit through the input-output bus.

6. The system of claim 4, wherein the first bridge unit receives responses for a plurality of cores from a plurality of co-processors on the input-output bus, generates responses for the plurality of cores in the fetch and add unit, and is further configured to choose among the responses from the plurality of co-processors on the input-output bus and the generated responses in the fetch and add unit to send to the plurality of cores.

7. The system of claim 1, wherein the input-output bus inputs to the first bridge unit as a plurality of inputs coupled with an input arbitration unit, the input arbitration unit configured to choose between the plurality of inputs to send to the first arbitration unit.

8. The system of claim 1, wherein the first bridge unit is further coupled directly to a plurality of cores, the first bridge unit configured to communicate directly with the plurality of cores.

9. The system of claim 1, wherein the input-output bus is coupled with at least one of a packet output unit, a packet input unit, a free pools source, timers, a packet order/work source, a secure key memory, a compression core, a decompression core, a hyper finite automata core, a random number generator, a RAID controller, at least one USB controller, at least one PCIe controller, and a miscellaneous input-output unit.

10. The system of claim 1, wherein the packet input unit and packet output unit are both coupled with a network protocol layer.

11. The system of claim 1, wherein the first bridge unit includes a memory free notification unit (MFNU) queue and an input-output bus queue, where the MFNU queue stores requests from the MFNU to free memory and the input-output bus queue stores requests from the input-output bus to read data,
    wherein a packet output queue stores packets from the packet output unit and a packet input queue stores packets from the packet input unit.

12. A method comprising:
    at a first bridge unit for processor access with a memory:
    requesting to read or write data;
    requesting to free memory;
    choosing among the request to read data and the request to free memory to transmit to the memory on a first memory bus;
    at a second bridge unit for packet data access with the memory:
    requesting to read packet data from a packet output unit;
    requesting to write packet data from a packet input unit to the memory;
    choosing among the request to read packet data and the request to write packet data to transmit to the memory on a second memory bus.

13. The method of claim 12, further comprising:
    at the first bridge unit:
    reading from the memory along the first memory bus, transmitting the reads along the first memory bus to the input-output bus, transmitting confirmations of writes along the first memory bus to the input-output bus; and
    at the second bridge unit:
    reading from the memory along the second memory bus, transmitting the reads along the second memory bus to the packet output unit, and transmitting confirmations of writes along the second memory busy to the packet input unit.

14. The method of claim 13, further comprising, at the first bridge unit:
    receiving requests from a plurality of cores,
    receiving free memory completions,
    reflecting requests from the input-output bus, and
    choosing among the reads from the memory, the confirmation of the reads, the requests from the plurality of cores, the free memory completions, and the reflected requests from the input-output bus to send to the input-output bus.

15. The method of claim 12, further synchronizing one or more cores with one or more core requests through a fetch and add unit included in the first bridge unit, wherein the fetch and add unit receives hardware availability information from a schedule/synchronize/order bus ("SSO Bus").

16. The method of claim 15, further comprising transmitting operations to the fetch and add unit from the packet output unit through the input-output bus.

17. The method of claim 15, further comprising at the first bridge unit, receiving responses from a plurality of co-processors on the input-output bus, generating responses in the fetch and add unit, and choosing among the responses from the plurality of co-processors on the input-output bus and the generated responses in the fetch and add unit to send to a plurality of cores.

18. The method of claim 12, wherein the input-output bus inputs to the first bridge unit as a plurality of inputs coupled with an input arbitration unit, the input arbitration unit configured to choose between the plurality of inputs to send to the first arbitration unit.

19. The method of claim 12, further comprising communicating from the first bridge unit directly with a plurality of cores.

20. The method of claim 12, wherein the input-output bus is coupled with at least one of a packet output unit, a packet input unit, a free pools source, timers, a packet order/work source, a secure key memory, a compression core, a decompression core, a hyper finite automata core, a random number generator, a RAID controller, at least one PCIe controller, at least one USB controller, and a miscellaneous input-output unit.

21. The method of claim 12, wherein the packet input unit and packet output unit are both coupled with a network protocol layer.

22. The method of claim 12, wherein the first arbitration unit is coupled with a memory free notification unit (MFNU) queue and an input-output bus queue, where the MFNU is coupled with the MFNU queue and the input-output bus is coupled with the input-output bus queue, wherein the packet output unit is coupled with a packet output queue and the packet input unit is coupled with a packet input queue.

* * * * *